United States Patent Office 2,709,758
Patented May 31, 1955

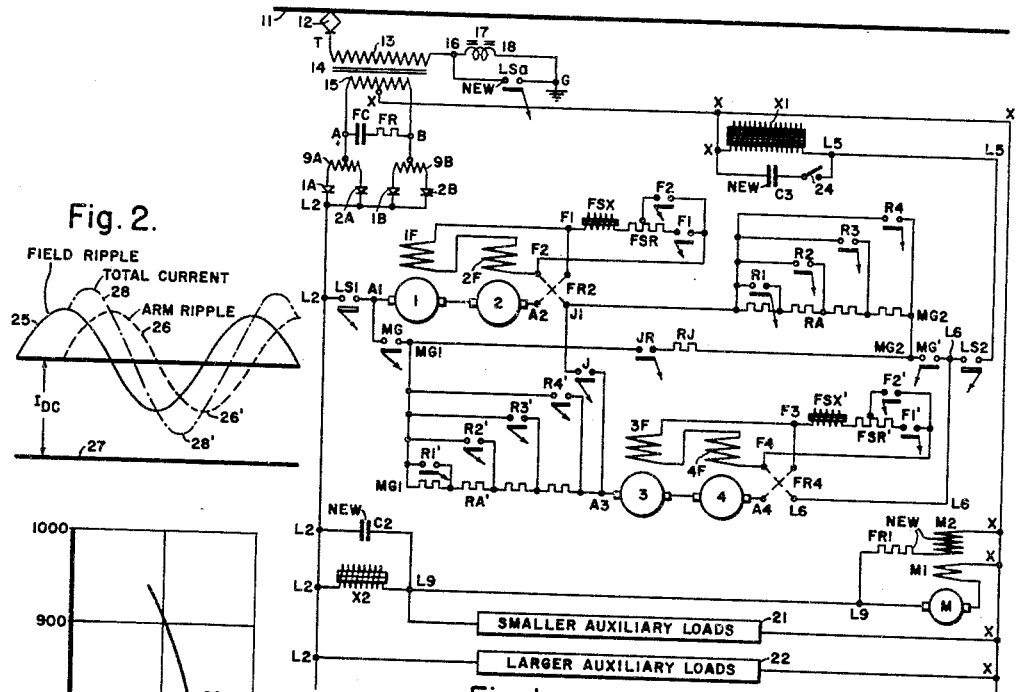

2,709,758

PULSATING-CURRENT SYSTEMS

Lloyd J. Hibbard, Pittsburgh, Pa., assignor to Westinghouse Electric Corporation, East Pittsburgh, Pa., a corporation of Pennsylvania Application May 5, 1954, Serial No. 427,727

5 Claims. (Cl. 307—105)

My present invention relates to pulsating-current systems such as are obtained in the output-circuit of a full-wave rectifier-assembly which is energized from a single-phase supply-circuit, so that the pulsating current of the output-circuit is a direct current having a substantial ripple consisting predominantly of the second harmonic which has twice the supply-circuit frequency. My invention is particularly applicable to rectifier-powered locomotives or other self-propelled vehicles, deriving their power from a single-phase trolley-system which is subject to telephone-interference considerations.

Most such rectified-current systems require as large a ripple as can be tolerated by the load-apparatus which is energized from the output-circuit of the rectifier-assembly, because a large ripple contributes to the reduction of the telephone-interference problems in the single-phase trolley-system. Most of such pulsating-current systems also involve a considerable variation in the load-current, and a type of load-system which includes a pulsating-current motor which will not operate satisfactorily with a pulsating-current supply in which the principal ripple-content is more than a certain percentage of the direct-current component of the load-current, this percentage being somewhere in the order of from 20% or 22% to 30% or 35%, or more, depending upon the nature of the motor and whether it is operating under heavy-load or light-load conditions. Most such pulsating-current systems use full-wave rectifier-assemblies which consist of a plurality of rectifier-means which are energized from a single-phase input-circuit which has an inductance sufficient to cause the conducting periods of successively operating rectifier-means to overlap for at least 20°, or for such other sufficient time as may be necessary, to reduce the magnitude of the telephone-interference harmonics which are produced in the trolley-wire supply-system.

These various fundamental requirements, which are more or less common to such pulsating-current systems, impose various practical difficulties. For example, it is usually not economically feasible to design the rectified-current motors so as to have sufficient self-inductance to hold the second-harmonic ripple down to the required low percentage-value, because the output-circuit of the rectifier-assembly has an average direct-current voltage which is 90% of the R. M. S. value of the single-phase input-voltage, and a double-frequency second-harmonic voltage which has a crest value of 60% of said R. M. S. value of the single-phase input-voltage. Consequently, it is a practical economic necessity, in most cases, to connect an externally connected direct-current choke-coil, connected in series with the rectified-current motor, in order to hold down the ripple-current to acceptable percentages of the direct-current component.

This direct-current choke-coil necessarily saturates at high load-currents, and it is necessary to design said choke-coil so that its unsaturated reactance is available, or substantially available, at the minimum load-current at which it is to be required to suppress the second harmonic to an acceptable percentage-value, because, when the load-current is small, a certain permissible percentage-value, say 30%, of ripple-current will be a much smaller current than the same percentage when the load-current is several times higher, and the direct-current choke-coil must be designed so as to give the entire load-circuit enough inductance to hold the ripple-current down to the required percentage-value at the minimum operating-current of the motor.

The motor may be either one motor or a plurality of motors, and it may either be a main traction motor or motors or an auxiliary motor such as the motor of a motor-generator set for charging a battery or for other purposes. If there is a very large spread between the maximum and minimum current which is drawn by the motor-load, the design of the direct-current choke-coil becomes extremely difficult, involving an excessively large size and weight and cost of the choke-coil. It is a feature of my present invention to reduce this item, by designing the choke-coil, not for the minimum motor-current, but for a somewhat larger current-value, such as, for example, from twice to four times the minimum current-value, and to produce the higher inductance which is required at the minimum current-value, by means of a parallel-connected capacitor.

One of the disadvantages of a large second-harmonic ripple is that, at extremely light load-currents, the ripple-magnitude may approach, and even exceed, the average direct-current magnitude, thus tending to reverse the instantaneous value of the total load-current at the times of the maximum negative crest-values of the ripple. When this happens, the rectifiers are extinguished, thus producing a chopped-off output-wave which is bad for the motors, and bad for the inductive-interference problem in the single-phase supply-circuit. Such problems usually concern the operation of the system when the main traction-motors are deenergized, and when the load-system on the rectifiers consists solely or largely of an auxiliary motor-load or loads, such as the battery-charging motor-generator set. The motor of this motor-generator set has heretofore usually been a compound motor, with its shunt winding energized from the terminals of the battery, said battery having a relatively low voltage as compared to the voltage of the rectifier output-circuit which is used to energize the traction-motors. In accordance with my present invention, I change this compound motor of the motor-generator set, by energizing its shunt winding across the output-circuit of the rectifier-assembly, connecting enough field-resistance in series with this shunt winding to make up the difference between the battery-voltage and the rectifier-output voltage. In this way, I make the shunt-field ripple-current substantially 90° out of phase with the armature-ripple current of the motor of the motor-generator set, thus at the same time reducing the effective percentage-value of the total double-frequency ripple-current which is drawn from the rectifier-output terminals, and also greatly improving the performance of this motor under its minimum load operating-conditions.

Another serious consequence of operating the rectifier-assembly with extremely small auxiliary loads, at certain times when the main traction-motors are deenergized, is that such a small rectifier-load will not permit the rectifiers to have a sufficient time or angle of overlap to avoid objectionable interference-producing ripples in the primary supply-circuit including the trolley-conductors. If there were just one rectifier-powered railway-unit to be considered, a high telephone-interference factor under such extremely light-load operating-conditions would perhaps not be at all objectionable, but when a hundred or more of such units are present, at the same time, in a single yard, all of them having auxiliary load-equipments energized, and none of them having their main traction-motors energized, the cumulative effect of the telephone-interference ripples is something which has to be taken into serious consideration.

It is one of the features of my invention to provide an auxiliary alternating-current commutating-reactor, which is connected in series with the primary or input-circuit of the rectifier-assembly of each railway-unit, and which is automatically short-circuited or cut out, whenever the main traction-motors of that unit are energized. In this manner, the current-rating of the auxiliary commutating reactor can be small, so that this reactor is small and inexpensive, since the main motor-current never passes through it, except possibly for the instant required to get a switch-contact closed. The input-circuit of the rectifier-assembly has a permanent inductance which is sufficient to cause the conducting periods of successively operating rectifiers to overlap for a sufficient time or angle, during any load-conditions which are present when the main traction-motors are energized; and when the main traction-motors are deenergized, the auxiliary commutating reactor adds enough reactance to maintain an adequate commutating-angle to avoid an objectionably high telephone-interference factor during the minimum-current conditions of the auxiliary load-equipment which is energized from the rectifiers.

With the foregoing and other objects in view, my invention consists in the circuits, systems, combinations, apparatus, parts, and methods of design and operation, as hereinafter described and claimed, and illustrated in the accompanying drawing, wherein:

Figure 1 is a diagrammatic view of circuits and apparatus, illustrating my invention in an exemplary form of embodiment.

Fig. 2 is a curve-diagram illustrating the effect and operation of my novel connection of the shunt field winding of the auxiliary compound motor M, and Fig. 3 is a curve-diagram illustrating the effect of my addition of a parallel-connected capacitor to the direct-current choke-coil.

In Fig. 1, I show a typical form of embodiment of my invention, in which a high-voltage single-phase trolley 11 supplies power to the pantograph 12 of a rectifier-powered railway-vehicle such as a locomotive or a unit of a multiple-unit car-system, the latter being specifically illustrated. It is to be understood that the trolley 11 is a part of a single-phase supply-circuit which is subject to telephone-interference considerations, as discussed in my Patent 2,636,995, of April 28, 1953.

The pantograph 7 is connected to the high-voltage terminal T of the primary winding 13 of a step-down transformer, which is provided with an iron core 14 and a secondary winding 15. The primary winding 13 has a low-voltage terminal 16, which is connected to ground G through an auxiliary alternating-current commutating reactor 17 which constitutes a part of my invention, this auxiliary reactor 17 being bypassed by the normally open back-contact LSa of a line-switch which will be subsequently described. This auxiliary reactor 17 is provided with an iron core 18 having an air gap.

The secondary winding 15 of the transformer is provided with two terminals A and B, and a mid-tap X. This secondary winding 15 is used to energize any desirable type of full-wave rectifier-assembly, which is illustrated as comprising four rectifiers 1A, 2A, 1B and 2B, although other rectifier-assemblies might be used. These four rectifiers are preferably separate arcing-type rectifier-tubes, such as ignitrons, although other rectifying means might be used. These four rectifiers are preferably connected in pairs, and energized from the respective secondary terminals A and B, the rectifiers 1A and 2A being energized from the secondary terminal A through a balance-coil 9A, while the rectifiers 1B and 2B are energized from the secondary terminal B through a balance-coil 9B. It is usually desirable to connect, across the two secondary terminals A and B, a filter-circuit comprising a capacitor FC and a resistance FR, as set forth in my previously mentioned Patent No. 2,636,995.

The output-terminals of the four rectifiers 1A, 2A, 1B and 2B are connected to an output-circuit terminal L2. With the particular polarity of rectifier-connections which are illustrated, these output rectifier-terminals are the cathodes of the rectifiers, so that the load-terminal L2 becomes the positive terminal of a load-circuit, the negative terminal of which is the mid-point conductor X. The output-terminals L2 and X of the rectifier-assembly thus constitute a substantially constant-voltage rectified-current circuit, assuming that the alternating-current trolley-voltage is constant. This output-circuit has a substantially constant average direct-current value, which may have a value of 780 volts, or any other convenient voltage, on which are superposed a number of ripples, which consist of the even harmonics of the supply-system frequency. Of these ripples, the largest one, and the only one with which my present invention is primarily concerned, is the lowest-frequency ripple, which is the second harmonic, and which would have a crest voltage of 468 volts in a rectifier-system in which the direct-current voltage-component is 780 volts.

The rectifier output circuit L2–X is used to energize both main and auxiliary pulsating-current load-circuits. The main load-circuit consists of the series iron-cored rectified-current traction-motors, which are illustrated as being four in number, having the armatures 1, 2, 3 and 4, and the main field windings 1F, 2F, 3F and 4F, respectively. These main traction motors 1 to 4 are illustrated as being controlled by means of a known control-system using variable accelerating resistances RA, RA' and RJ, with suitable switches whereby the motors may be connected in either a series motor combination or a parallel motor combination, with field-shunting at high speeds, in accordance with a master-controller sequence-chart MC. Since this control-system is well known, and is obvious from the drawing, it is believed that a detailed description thereof is not necessary, except to note that it involves a first line-switch LS1 which is connected to the line L2, and a second line-switch LS2 which is connected to a line L5 which is in turn connected to the return-circuit X through the main D. C. choke-coil X1. The main motor equipment also includes field-reverses FR2 and FR4, and field-shunts, one of which includes the field-shunt reactor FSX and the field-shunt resistor FSR, while the other field-shunt comprises the same parts with primes added to their designations.

The connections for the series motor-combination are traceable from the positive terminal L2 through the line-switch LS1, the motor-terminal A1, the two motor armatures 1 and 2, the motor-terminal A2, the field-reverser FR2 which is connected to the field-terminals F1 and F2 of the first two fields 1F and 2F, the conductor J1, the accelerating resistance RA, the conductor MG2, the accelerating resistance RJ, the switch JR, the conductor MG1, the accelerating resistance RA', the motor terminal A3, the armatures 3 and 4, the field reverser FR4 which is connected to the field-terminals F3 and F4 of the field windings 3F and 4F, the conductor L6, the line-switch LS2, the conductor L5, and the main direct-current reactor X1, to the return-circuit X.

The connections for the parallel motor-combination consist of two circuits which are connected in parallel between the terminals A1 and L6, the first circuit including the motors 1 and 2, and the switch MG', while the second circuit includes the switch MG and the motors 3 and 4, as will be well understood.

I have illustrated my invention in a main-motor control-system using a substantially constant rectified-current voltage and variable accelerating resistors, as being the most convenient for multiple-car train-operation, and also as being convenient for the excitation of various necessary auxiliary rectified-current loads from the alternating-current trolley 11, without requiring extra or separate rectifiers for energizing these auxiliary loads.

Perhaps the most troublesome of these auxiliary rectified-current loads is an auxiliary compound rectified-current iron-cored motor having an armature M, a series field winding M1, and a shunt field winding M2. Actually, this motor M is a part of a motor-generator set, the rest of the set being not illustrated, and being used, among other things, to charge a relatively low-voltage battery (not shown) which is carried by the vehicle. So far as my present invention is concerned, this auxiliary motor M may be regarded as being representative of any variably loadable rectified-current motor-means which draws, at different times, widely variable armature-currents, which may vary, by way of example, from 4 amperes to 40 amperes.

In accordance with my present invention, this auxiliary motor M is provided with a specially designed, externally connected auxiliary direct-current choke-coil X2. Also, in accordance with my invention, the shunt field winding M2 of this motor is provided with a special high-resistance field-resistance FR1. Associated with my specially designed auxiliary direct-current choke-coil X2 is a parallel-connected capacitor C2, which will be subsequently described.

The energizing-circuits for the auxiliary rectified-current motor M comprise first the parallel-connected capacitor C2 and choke-coil X2, which are connected between the line L2 and a line L9. From the line L9, two circuits continue, namely an armature-circuit through the armature M and the series field winding M1 to the return-circuit conductor X, and a field-circuit from L9, through the field-circuit resistor FR1 and the shunt field M2, to the return circuit conductor X. Certain smaller auxiliary loads 21 may also be connected between the conductors L9 and X, while certain larger auxiliary loads 22 may be connected across the rectifier-output terminals L2 and X.

The operation and effects of my novel features will now be described.

To illustrate the design and operation of the auxiliary direct-current choke-coil X2 and its parallel-connected capacitor C2, Fig. 3 shows a reciprocal-type curve 22, which has been plotted to show an approximation of the manner in which the apparent overall inductance of the choke-coil capacitor-combination X2—C2 should vary, at different currents drawn by the auxiliary motor M, to hold the second-harmonic current-component to a value of 30% of the direct-current motor-component at every load. This curve is obtained by first calculating the total inductance in millihenries, which is necessary to produce a 50-cycle current of 30% of the direct-current amperes, at each load, assuming a 50-cycle applied voltage of 468 volts, and then subtracting the estimated motor-impedance at each load, to obtain the externally connected inductance which must be supplied by the reactor-capacitor combination X2—C2. This assumes a 25-cycle supply-system.

It will be observed from the curve 22 in Fig. 3 that, if the capacitor C2 had not been used, it would have been necessary to design the auxiliary direct-current choke-coil X2 so that it would have an inductance of about 950 millihenries at a direct-current load of 4 amperes. This would have involved a choke-coil having a size and cost commensurate with that of the motor which it was designed to protect. It will be noted, from the curve 22, that a direct-current choke-coil, to have such an impedance-curve without the parallel-connected capacitor, would still be operating slightly beyond the knee of the saturation-curve at the minimum motor-current of 4 amperes.

According to my invention, when a suitable parallel-connected capacitor C2 is connected across the terminals of the auxiliary direct-current choke-coil X2, it becomes feasible to design this coil so that it will operate substantially unsaturatedly at small direct-currents in the range approximately between 4 and 14 amperes, as shown by the substantially flat curve-portion 23 in Fig. 3. At higher currents, the core of the choke-coil will begin to saturate, so that the choke-coil inductance will approximately match the inductance of the theoretical curve 22 for all direct-current amperes between 14 and 40. Such a choke-coil would have a maximum unsaturated inductance of the order of 500 millihenries or slightly less. When a capacitor C2 of 23.5 microfarads is connected in parallel with the choke-coil which is represented by the curve 23, it will bring the apparent inductance of the parallel-resonant combination X2—C2 up to an approximation of the values shown in the theoretically calculated curve 22, thus representing a very considerable overall saving in cost, weight and space-requirements. It will be noted that the capacitor C2 has a value such as to approach parallel-resonance with the inductance of the choke-coil X2 when the motor-current has a value near its minimum.

It will be understood that all direct-current choke-coils are subject to saturation, at least those which are made with iron cores, as is the case of inductances of the current and frequency-ratings which are here involved. These iron cores necessarily have to have rather large gaps therein. Since the gaps are so large, it is preferable to make the iron cores of such direct-current choke-coils simply as straight bundles of laminations, cut off at their ends, and having a suitable ratio of length to cross-sectional area. With such a construction, no magnetic material is used for the supporting brackets for the coil. The flux will return over an extremely wide area in the vicinity of the coil, returning through the air and through any magnetizable members which may be in the vicinity. The effective air-gap length of such a core, figured on the equivalent air gap having the same cross-sectional area as the core, would be something of the order of 3 inches, more or less. Such a coil is frequently called a swinging choke, because its effective inductance varies or "swings" with the load, depending upon the degree of saturation, giving it a characteristic similar to that of a reciprocal curve, as shown in Fig. 3.

The total variation in the main direct-current load which is drawn by the traction-motors 1 to 4, in the particular system which is shown in Fig. 1, is not nearly as great as the 10-to-1 ratio which prevails for the auxiliary motor M. Usually, the maximum starting-current of these traction motors is not more than about 4 times the minimum or full-speed motor-current, with the series-motor connection. Hence, it is usually quite feasible to design the main direct-current choke-coil X1 so that it has the approximate swinging-choke impedance-value which is desirable for permitting the second-harmonic ripple-component to be, at all times, somewhere close to the percentage-value which the traction-motors can successfully stand, under each operating-condition of the motors. However, my invention, with respect to the parallel-resonant inductance-capacitance combination X2—C2, is not limited to application to auxiliary motor loads, and it can be applied to the main direct-current choke-coil or inductance X1, as is indicated, in Fig. 1, by a capacitor C2, which may be connected in parallel with the main choke X1, by means of a switch 24. Such a main-choke combination may be more particularly desirable in cases in which the variation in the motor-current of the traction-motors extends over a wider range than in the particular apparatus which I have shown in Fig. 1.

Another feature of my invention relates to the connections for energizing the shunt field winding M2 of the compound auxiliary rectified-current motor M. This part of my invention is particularly applicable to situations in which the choke-coil X2, either with or without its parallel-connected capacitor C2, is insufficient to hold the second-harmonic ripple-current down to as small a percentage of the motor-current as is desirable, at the lowest possible range of the motor-current. Such a condition could arise if the capacitor C2 were omitted, or if it burnt out, so that it would no longer be available to hold down the value of the ripple-current at low motor-loads.

Let us assume, therefore, by way of example, that the auxiliary motor M has a minimum armature-current of 4 direct-current amperes, and that it draws a shunt-field current of 4 direct-current amperes under these conditions; and let us further assume that there is a 100% second-harmonic ripple in both the armature M and the shunt field winding M2. Then, the total direct current which is drawn by the motor through its motor-armature M and its shunt field M2 will be 8 amperes, as indicated in Fig. 2 by the horizontal line $I_{DC}$. Then, by reason of the field-resistance FR1, which has a value several times higher than inductance of the shunt field winding M2, the field-ripple will be substantially in phase with the impressed second-harmonic voltage, as indicated by the full-line sine wave 25 in Fig. 2, whereas the armature ripple, being in a highly inductive circuit, will lag substantially 90° behind the impressed ripple-voltage, as indicated by the dotted sine-wave curve 26 in Fig. 2.

If the shunt field-winding M2 had not been connected across the motor-terminals, but had been energized from a battery (not shown), then the 100% ripple 26 in the armature-current would have pulled the instantaneous load-current of the armature down to zero at the point 26', and the rectifier-tube or tubes which were carrying the current at that instant would have become extinguished, either then or at some point sooner than the point 26', assuming that the tubes had no other material pulsating-current load on them at the time, and remembering that the base-line 27 would be raised up to the level 26' with no field-current flowing. Such extinguishment of the tube or tubes would produce a ragged or chopped-off output voltage, which would result in poor motor-performance and poor inductive-interference performance.

By the use of my invention, in which a large field-resistance FR1 is connected in series with the shunt field M2, and in which this field is connected in parallel with the armature circuit, the total ripple-current which is drawn by the armature and field combined is as shown in the dot-dash line 28 in Fig. 2. Since the vectorial sum of two sine waves, which are 90° out of phase with each other, is considerably less than the algebraic sum of these waves, it will be noted that the instantaneous value of the total current never reaches zero, as indicated at 28' in Fig. 2. Thus, the arc is not extinguished in the rectifier or rectifiers which are carrying the current at this time. And not only that, the dephased relations of the ripple-currents in the armature and the field apparently considerably improve the commutation of the motor M, so that black or perfect commutation is experienced at all times.

A third feature of my invention relates to the very great desirability for preventing operation of the rectifier-assembly 1A to 2B with a commutating angle which is less than 20°, or some other value which experience proves necessary. When the load-current drawn by the rectifiers becomes smaller and smaller, this commutating-angle becomes smaller, and if the commutation-angle becomes too small, the percentage-values of the interference-provoking ripples which are caused to flow in the primary circuit or trolley-line become undesirably large, causing telephone-interference troubles.

It is not feasible to make the permanently effective primary-circuit impedance of the transformer and the connected supply-line large enough to maintain a desirable commutating-angle at small loads which may be only a small fraction of the minimum motor-current which is drawn by the main traction-motors 1 to 4. Furthermore, it is not even desirable to do so, because this would cause a poor voltage-regulation of the line-voltage, and it would cause the vehicle-load to draw single-phase currents having a very poor power factor.

According to my invention, however, I add a small auxiliary alternating-current reactor 17 for commutating purposes, this auxiliary reactor being connected in series with the primary circuit of the transformer whenever the main traction-motor load is disconnected from the rectifier output-circuit, and being of a value sufficient to produce the necessary commutating angle of overlap during the minimum auxiliary load-conditions. In this way, the auxiliary reactor 18 need not have a continuous current-rating sufficient to handle anything like the load-currents which are drawn by the main traction-motors 1 to 4, so that this reactor may be small in size, and small in cost and space requirements. To make such a small-sized auxiliary reactor 17 possible, it should be shunted by a switch-means which is automatically operated to be closed whenever the main motors are operating, and to be opened whenever the main motors are not operating. Any suitable means may be used for this purpose, and I have indicated such a switching-means in the form of an auxiliary make-contact LSa, which may be mounted on one or the other of the two line-switches LS1 and LS2, or which may be a separate reactor-shunting switch-contact LSa which is controlled by the master-controller, as indicated by the sequence-chart MC, so that the reactor shunting contact LSa is open when the main controller-means is "off," and closed when the main controller-means is "on."

By means of the various expedients which I have introduced in accordance with my present invention, as hereinabove described, it will be apparent that I have considerably improved the design and operation of rectifier-powered vehicles in several important respects, with a view to producing both a satisfactory rectified-current motor-operation, and a satisfactory protection against inductive-interference troubles, all with a minimum cost in the size and weight and expense of the necessary equipment.

While I have illustrated my invention in a single preferred form of embodiment, I wish it to be understood that I am not limited to this one precise form, or to the precise numerical examples which I have used in the explanation of the invention.

I claim as my invention:

1. In combination, a variably loadable iron-cored direct-current motor-means, a motor-circuit for energizing said motor-means, said motor-circuit serially including a direct-current iron-cored choke-coil, pulsating-current supply-terminals for said motor-circuit for supplying said motor-circuit with a direct current having a substantial ripple consisting predominantly of a predetermined alternating-current frequency, and a capacitor connected in parallel-circuit relation to said choke-coil, characterized by said choke-coil having a substantially non-saturated self-inductance, when traversed by the minimum motor-current, which is less than the serially connected inductance which is necessary to limit the motor-current ripple to a desirable percentage-value for desirable motor-operation at said minimum motor-current, said choke-coil becoming saturated when traversed by larger motor-currents and having a self-inductance, at each of said larger motor-currents, which is sufficient to limit the motor-current ripple to a desirable percentage-value in each case, over a major portion, less than all, of the entire range of motor-currents, and said capacitor having such a value as to approach parallel-resonance with the inductance of the choke-coil when the motor-current has a value near its minimum, the apparent inductance of said parallel-connected choke-coil and capacitor being sufficient to limit the motor-current ripple to a desirable percentage-value at the minimum motor-current.

2. In combination, a single-phase supply-circuit which is subject to telephone-interference considerations, a full-wave rectifier-assembly which has an output-circuit for supplying a direct current having a substantial ripple consisting predominantly of the second harmonic which has twice the supply-circuit frequency, said rectifier-assembly comprising a plurality of rectifier-means, a means for energizing the rectifier-means from the supply-circuit so that the substantial value of said ripple is advantageous in reducing the telephone-interference problems of the supply-line, a variably loadable iron-cored direct-current motor-means, a direct-current iron-cored choke-coil, a motor-circuit for energizing said motor-means, in series with said choke-coil, from said output-circuit, and a capacitor connected in parallel-circuit relation to said choke-coil, characterized by said choke-coil having a substantially non-saturated self-inductance, when traversed by the minimum motor-current, which is less than the serially connected inductance which is necessary to limit the motor-current ripple to a desirable percentage-value for desirable motor-operation at said minimum motor-current, said choke-coil becoming saturated when traversed by larger motor-currents and having a self-inductance, at each of said larger motor-currents, which is sufficient to limit the motor-current ripple to a desirable percentage-value in each case, over a major portion, less than all, of the entire range of motor-currents, and said capacitor having such a value as to approach parallel-resonance with the inductance of the choke-coil when the motor-current has a value near its minimum, the apparent inductance of said parallel-connected choke-coil and capacitor being sufficient to limit the motor-current ripple to a desirable percentage value at the minimum motor-current.

3. In combination, a single-phase supply-circuit, a rectifier-means which has an output-circuit for supplying a direct-current having a substantial ripple consisting predominantly of the second harmonic which has twice the supply-circuit frequency, a means for energizing the rectifier-means from the supply-circuit, the rectifier-means being subject to objectionable operating-conditions when its instantaneous load-current becomes very small during any portion of a supply-frequency cycle, a variably loadable iron-cored motor having an armature circuit and a shunt field-winding circuit, a field-winding resistance serially included in said shunt field-winding circuit, and means for at times energizing both said armature circuit and said shunt field-winding circuit as the principal load which is connected across said output-circuit at that time, characterized by the fact that the current which traverses said armature-circuit during light-load motor-operation has a minimum instantaneous current-value which approaches the small instantaneous current-value which would subject the rectifier-means to objectionable operating conditions, and has a second-harmonic ripple which is approximately in quadrature phase relation to the second-harmonic voltage-component of said output-circuit, while the current which traverses the shunt field-winding circuit has a direct-current component of approximately the same order of magnitude as the direct-current component of the current in the armature-circuit during light-load motor-conditions, and has a second-harmonic ripple which is approximately in phase with the second-harmonic voltage-component of said output-circuit.

4. In combination, a single-phase supply-circuit which is subject to telephone-interference considerations, a full-wave rectifier-assembly which has an output-circuit for supplying a direct current having a substantial ripple consisting predominantly of the second harmonic which has twice the supply-circuit frequency, said rectifier-assembly comprising a plurality of rectifier-means, a means for energizing the rectifier-means from the supply-circuit so that the substantial value of said ripple is advantageous in reducing the telephone-interference problems of the supply-line, a main rectified-current load-means which draws variable currents of a substantial magnitude when said main load-means is energized, an auxiliary rectified-current load-means which draws variable currents of a magnitude which is always considerably smaller than the minimum value of the main-load current, a main controller-means for at times connecting said main load-means to said output-circuit, and a connection-means for more continuously connecting said auxiliary load-means to the same output-circuit, characterized by the fact that the input-circuit of said rectifier-assembly has a permanent inductance sufficient to cause the conducting periods of successively operating rectifier-means to overlap for a sufficient time during any main-load conditions, but for an insufficient time during certain auxiliary-load conditions, considered from the standpoint of acceptable telephone-interference conditions in the supply-line, in combination with an auxiliary commutating reactor, and a means, synchronized with said main controller-means, for connecting said auxiliary commutating reactor in series-circuit relation in said input-circuit when said main controller-means is "off," and for substantially cutting said auxiliary commutating reactor out of said input-circuit when said main controller-means is "on," said auxiliary commutating reactor having an inductance sufficient to bring the total input-circuit inductance up to a value sufficient to cause a sufficient overlap during substantially any auxiliary-load conditions.

5. In combination, a single-phase supply-circuit which is subject to telephone-interference considerations, a full-wave rectifier-assembly which has an output-circuit for supplying a direct current having a substantial ripple consisting predominantly of the second harmonic which has twice the supply-circuit frequency, said rectifier-assembly comprising a plurality of rectifier-means, the rectifier-means being subject to objectionable operating-conditions when its instantaneous load-current becomes very small during any portion of a supply-frequency cycle, a means for energizing the rectifier-means from the supply-circuit so that the substantial value of said ripple is advantageous in reducing the telephone-interference problems of the supply-line, a main rectified-current iron-cored motor-means which draws variable currents of a substantial magnitude when said main load-means is energized, a main rectified-current iron-cored choke-coil, an auxiliary rectified-current load-means which draws variable currents of a magnitude which is always considerably smaller than the minimum value of the main-motor current, said auxiliary-load-means comprising a variably loadable iron-cored motor having an armature circuit and a shunt field-winding circuit, an auxiliary rectified-current iron-cored choke-coil serially included in said armature-circuit, a field winding resistance serially included in said shunt field-winding circuit, a main controller-means for at times serially connecting said main motor-means and said main choke-coil across said output-circuit, a connection-means for more continuously connecting said auxiliary load-means to the same output-circuit, whereby said armature circuit and said field-winding circuit may at times constitute the principal load which is connected across said output-circuit when the main controller-means is "off," and a capacitor connected in parallel-circuit relation to said auxiliary choke-coil, characterized by the fact that said auxiliary choke-coil has a substantially non-saturated self-inductance, when traversed by the minimum armature-current, which is less than the serially connected inductance which is necessary to limit the armature-current ripple to a desirable percentage-value for desirable motor-operation at said minimum motor-current, said auxiliary choke-coil becoming saturated when traversed by larger armature-currents and having a self-inductance, at each of said larger armature-currents, which is sufficient to limit the armature-current ripple to a desirable percentage-value in each case, over a major portion, less than all, of the entire range of armature-currents, and said capacitor having such a value as to approach parallel-resonance with the inductance of the auxiliary choke-coil when the armature-current has a value near its minimum, the apparent inductance of said parallel-connected choke-coil and capacitor being sufficient to limit the armature-current ripple to a desirable percentage-value at the minimum armature-current; further characterized by the fact that the current which traverses said armature-circuit during light-load motor-operation has a minimum instantaneous current-value which approaches the small instantaneous current-value which would subject the rectifier-means to objectionable operating-conditions, and has a second-harmonic ripple which is approximately in quadrature phase relation to the second-harmonic voltage-component of said output-circuit, while the current which traverses the shunt field-winding circuit has a direct-current component of approximately the same order of magnitude as the direct-current component of the current in the armature-circuit during light-load motor-conditions, and has a second-harmonic ripple which is approximately in phase with the second-harmonic voltage-component of said output-circuit; and still further characterized by the fact that the input-circuit of said rectifier-assembly has a permanent inductance sufficient to cause the conducting periods of successively operating rectifier-means to overlap for a sufficient time during any main-load conditions, but for an insufficient time during certain auxiliary-load conditions, considered from the standpoint of acceptable telephone-interference conditions in the supply-line, in combination with an auxiliary commutating reactor, and a means, synchronized with said main controller-means, for connecting said auxiliary commutating reactor in series-circuit relation in said input-circuit when said main controller-means is "off," and for substantially cutting said auxiliary commutating reactor out of said input-circuit when said main controller-means is "on," said auxiliary commutating reactor having an inductance sufficient to bring the total input-circuit inductance up to a value sufficient to cause a sufficient overlap during substantially any auxiliary-load conditions.

No references cited.